United States Patent [19]

Goltz et al.

[11] 4,395,387
[45] Jul. 26, 1983

[54] METHOD FOR MANUFACTURING WATER GLASS CEMENT HARDENERS

[75] Inventors: Kurt Goltz, Exton; William T. West, Strafford, both of Pa.

[73] Assignee: Pennwalt Corporation, Philadelphia, Pa.

[21] Appl. No.: 310,559

[22] Filed: Oct. 13, 1981

[51] Int. Cl.³ ............................................. C01B 25/36
[52] U.S. Cl. .................................... 423/305; 423/314
[58] Field of Search ....................... 423/311, 314, 305

[56] References Cited

U.S. PATENT DOCUMENTS

| | | | |
|---|---|---|---|
| 1,617,098 | 2/1927 | Blumenberg | |
| 2,662,022 | 12/1953 | Dietz | 106/74 |
| 3,194,632 | 7/1965 | Baniel et al. | 23/105 |
| 3,223,481 | 12/1965 | Geiersberger et al. | 23/109 |
| 3,387,922 | 6/1968 | Beltz et al. | 23/106 |
| 3,445,257 | 5/1969 | Hloch et al. | 106/84 |
| 3,650,683 | 3/1972 | Hloch et al. | 23/105 |
| 3,801,704 | 4/1974 | Kobayashi et al. | 423/309 |
| 3,943,231 | 3/1976 | Wasel-Nielen et al. | 423/311 |
| 4,005,172 | 1/1977 | Birchall et al. | 423/300 |
| 4,014,813 | 4/1977 | Shidlovsky | 252/301.4 P |
| 4,021,528 | 5/1977 | Schlegel | 423/308 |
| 4,147,758 | 4/1979 | Adrian et al. | 423/315 |
| 4,312,844 | 1/1982 | Neely et al. | 423/314 |

*Primary Examiner*—O. R. Vertiz
*Assistant Examiner*—Wayne A. Langel

[57] ABSTRACT

Condensed aluminum phosphates, useful as hardeners for water glass cements, are prepared in a solid state reaction by dry mixing aluminum hydroxide with an ammonium phosphate, heating the mixture at an initial temperature below 250° C. for longer than about 2 hours and then raising the temperature in stages to at least about 400° C. so as to minimize foaming and to avoid any liquefaction of the mixture during the reaction.

12 Claims, No Drawings

METHOD FOR MANUFACTURING WATER GLASS CEMENT HARDENERS

BACKGROUND OF THE INVENTION

This invention relates generally to the field of hardeners for cements and mortars and more specifically to an improved method of making a condensed aluminum phosphate hardener.

Water glass cements and mortars consist of mixtures of water glass (which in this connection maybe understood as amorphous, water soluble alkali metal silicates, mostly sodium and potassium silicates with a mole ratio of $SiO_2$ to $M_2O$ of greater than one and for all practical purposes, greater than two, where M represents the alkali metal) and acid resistant fillers, such as quartz sands, clays, barium sulfate, etc. The water glass is usually added as a solution; however, it can also be added as a dry powder with water being added to the dry mixture to make up the cement.

Water glass cements have been used since late in the last century. At that time, such cements consisted mainly of a mixture of sodium water glass solutions and quartz flours and sands. The hardening of these cements took weeks and months and depended to a great extent on the reaction of the carbon dioxide in the air with the water glass as follows:

$$(M_2O)_X \cdot (SiO_2)_Y + X \cdot CO_2 \rightarrow X \cdot M_2CO_3 + Y \cdot SiO_2$$

where M is the alkali metal. Water glasses are polymers with the molecular weight in solution dependent upon concentration, temperature, and the ratio of $M_2O$ to $SiO_2$. The absolute value of X can be anywhere from 4 to more than 100. Of significance is only the ratio of Y to X which normally is $\geq 2$.

Insoluble silica is precipitated by the reaction which holds the fillers together. These cements were highly resistant to acids, but were very porous and not resistant to water. In the mid 1920's, the first water glass cements with additions of hardeners were prepared by adding sodium or potassium fluosilicates to the fillers. Theoretically, any acid bearing material will precipitate silica from a water glass solution as follows:

$$(M_2O)_X \cdot (SiO_2)_Y + 2X\ H^+ \rightarrow 2X\ M^+ - Y \cdot SiO_2 + X\ H_2O$$

and specifically $$Na_2O \cdot 3SiO_2 + 2HCl \rightarrow 2NaCl + 3SiO_2 + H_2O$$

However, most acid materials react much too fast to be of any practical value because the cements would set the very moment the ingredients are mixed together.

The sodium and potassium fluosilicates proved themselves very practical over the years and are still used in many places. However, these compounds possess some inherent drawbacks. Besides being poisonous, they will release hydrofluoric acid fumes when used in acid service. These fumes are highly corrosive to otherwise acid resistant equipment, including stainless steel, glass and ceramics. The reaction products of sodium and potassium fluosilicates with the water glass are also 85% water soluble, which tends to increase the porosity of the cement which is another undesirable side effect.

Therefore, other materials were tried, for instance, such as disclosed in U.S. Pat. No. 2,662,022. One compound mentioned in this patent, formamide, is still used commercially. However, these materials also have some deficiencies, including poor storability.

A different type of hardener is based on condensed aluminum phosphates. U.S. Pat. Nos. 3,445,257 and 3,943,231 disclose the manufacturing and use of such hardeners. These types of hardeners, to our knowledge, are superior to any other hardener used at the present time, because they are non-poisonous, very stable in storage, and result in cements and mortars with superior properties. These hardeners are widely used.

As good as these condensed aluminum phosphate hardeners are, the known methods used to make them are tedious and require large amounts of energy. First, an aluminum orthophosphate solution is prepared by dissolving aluminum hydroxide in phosphoric acid. Then, the solution has to be heated until all the water has been removed. This step alone requires more than 50,000 BTU's for every 100 pounds of material. U.S. Pat. No. 3,445,257 advises to dry and heat the reaction mass either in bulk or in a spray dryer. Either method produces a rock hard intermediate product which has to be ground in heavy duty equipment such as a hammer mill or an edge runner mill. Although U.S. Pat. No. 3,943,231 discloses a one-step manufacturing process, this process consumes even more energy and the reaction parameters are hard to control. Because a 100-200% excess of phosphoric acid has to be used in these known processes, the mixture attacks the equipment it is contained in at the high temperatures necessary for the evaporation. Only a few rather costly materials can withstand hot concentrated phosphoric acid (e.g.: tantalum, silver, platinum).

U.S. Pat. No. 3,801,704 discloses a process for preparing condensed aluminum phosphate for catalysts, heat-resistant materials and antirusting agents using a two stage process. Ammonium phosphate and aluminum hydroxide can be used. The first step produces a wet, semisolid intermediate product which is dehydrated to form a crystalline product having an X-ray diffraction pattern with a high peak at $2\theta = 11.2°$. The first stage is carried out with agitation at temperatures of 90° C. to 400° C., and preferably 250° C. to 300° C. for 1 to 2 hours. The second stage is carried out between about 200°-400° C. for more than 3 hours.

The subject of our present invention is an improved method of preparing condensed aluminum phosphate cement hardeners which has advantages over the methods which were previously known. We have found that these materials can be prepared by an energy efficient, non-corrosive, solid state reaction of aluminum hydroxide with ammonium phosphate powders to provide an easily friable product without the need for expensive equipment. The x-ray diffraction pattern does not show a peak at $2\theta = 11.2°$ so that the product differs from the materials described in U.S. Pat. No. 3,801,704. The X-ray diffraction pattern has a high peak at about $2\theta = 16.1°$ and is similar to commercial condensed aluminum phosphate hardeners in this respect although the overall patterns are different.

BRIEF SUMMARY OF THE INVENTION

In accordance with this invention, there is provided a method of making a condensed aluminum phosphate comprising dry mixing aluminum hydroxide with an ammonium phosphate and heating the mixture in stages so as to form by a solid state reaction a condensed aluminum phosphate which is useful as a hardener for water glass cements. By a solid state reaction is meant a reaction in which partial melting or liquefaction of the reaction mixture is avoided so that the mixture remains dry and does not become wet or semisolid. The time and temperature of the first stage must be sufficient to decompose the ammonium phosphate to form anhydrous phosphoric acid, which reacts with the aluminum hydroxide, while avoiding any liquefaction and minimizing foaming of the mixture either at this stage or later in the process. This is accomplished by heating at a temperature below 250° C. for longer than 2 hours. The mixture is then heated in stages to a temperature of at least about 400° C. to form the condensed aluminum phosphate hardener.

DETAILED DESCRIPTION

In the process of the invention, an ammonium phosphate is heated at an elevated temperature sufficient to cause it to decompose to form ammonia gas and anhydrous phosphoric acid. Although all three ammonium phosphates, i.e., mono-, di-, and triammonium phosphate will work, the monoammonium phosphate is preferred because less ammonia is generated. The phosphoric acid formed reacts immediately with the aluminum hydroxide present. It is important that the first heating step is performed at a relatively low temperature, i.e. about 251° C. or below (preferably from 190° C. to 210° C.) and the duration of the first step lasts for more than two hours. At temperatures above about 215° C. orthophosphoric acid loses water and forms condensed acids and too fast a heat-up results in partial liquefaction and foaming of the batch. The result is materials which are hard to pulverize and which have inferior hardening properties. Although it may be possible to obtain satisfactory results at heating temperatures somewhat about 215° C., we have found that the temperature must be kept below 250° C. in the first heating step. A heating cycle of 16 hours at 200° C. for the first heating step provides excellent results. We have found that extending the heating at 200° C. beyond 16 hours does not have a detrimental effect but is unnecessary. The actual minimum time necessary at any particular temperature depends on batch size and the type of furnace used.

Because of the ammonia generated, the furnace should be of a closed type (i.e.: muffle furnace) with an outlet for the ammonia gas and an inlet for forced air in order to flush tht furnace chamber. The ammonia can be absorbed in water to form ammonium hydroxide solution, which can be used elsewhere or recycled by reaction with phosphoric acid to make more ammonium phosphate.

Further heating is done in several steps. For example, 250° C. as the second step, 300° C. as the third step and 400° C. as the final step. The 250° C. step assures that the batch is sufficiently reacted so that decomposition of aluminum hydroxide and phosphoric acid will not occur when the temperature is raised to 300° C. At a temperature of 300° C., aluminum hydroxide decomposes and phosphorus pentoxide would sublimate from the phosphoric acid if the components were not reacted sufficiently beforehand. The last step stabilizes the hardener and determines the work life and set time when the material is used to harden a cement mix. At the heating times employed, about 400° C. is the minimum temperature required to obtain a good hardener and 500° C. is the maximum temperature necessary. Higher temperatures are apparently not detrimental, but little different in properties was noted in batches made at 500° C. and 550° C.

After the initial step in the heating process, 1.5 to 4 hour time durations are sufficient for each of the remaining steps. After the mixture is reacted and has cooled, it is ground, for example, in a ball mill, and sifted. The amounts of aluminum hydroxide and ammonium phosphate are chosen to provide ratios of $Al_2O_3$ to $P_2O_5$ of from about 2:1 to 3:1 with a ratio of about 2.5 to 1 being preferred. The hardeners are mixed with water glass and fillers to form water glass cement mixtures.

The invention is further illustrated by, but is not intended to be limited to, the following examples wherein percents are percents by weight unless otherwise indicated.

EXAMPLE 1

A premix of 52 grams of Al(OH)$_3$ (66.3% $Al_2O_3$) and 148 grams $NH_4H_2PO_4$ was prepared by ball milling the ingredients together for three hours and then screening through a No. 100 mesh U.S. standard size sieve. The $P_2O_5$ to $Al_2O_3$ ratio was 2.5. Similarly, 36.3 grams of Al(OH)$_3$ and 163.7 grams of $NH_4H_2PO_4$ were ground and sifted in the same way. The $P_2O_5$ to $Al_2O_3$ ratio of this sample was 3.0. Forty gram portions of each premix were placed in porcelain crucibles, put in a muffle furnace and heated according to the following schedule:

16 Hours @ 200° C.
3.5 Hours @ 250° C.
3 Hours @ 300° C.
1.5 Hours @ 390° C.
3.0 Hours @ 550° C.

Yield for 2.5 ratio batch: 25.1 grams = 62.8% of charge.
Yield for 3.0 ratio batch: 23.9 grams = 59.8% of charge.
Available acidity for 2.5 ratio batch:
   10.7 milliequivalents/gram.
Available acidity for 3.0 ratio batch:
   9.2 milliequivalents/gram.

The finished batches were ground by hand in a mortar and sifted through a No. 100 mesh sieve.

An X-ray diffraction pattern was obtained on the 2.5 ratio product showing a high peak at about $2\theta = 16.1°$ and other peaks characteristic of $Al(PO_3)_3$ Form B along with a peak at about 14.2°. There was no peak at 11.2°.

Cement sample batches were prepared using each hardener product. The first batch included a mixture of 96.2 grams of quartz sand filler with 3.8 grams of the 2.5 ratio product and 37.5 grams of a potassium water glass solution having a concentration of 40–42% and a mole ratio of $SiO_2$ to $K_2O$ of 2.8. Similarly, 95.6 grams of quartz sand filler, 4.4 grams of the 3.0 ratio product and 37.5 grams of the 2.8 ratio water glass solution were mixed.

As a control, a third batch was mixed using: 96.2 grams of fillers, 3.8 grams of a commercial condensed aluminum phosphate hardener and 37.5 grams of the 2.8 ratio water glass solution.

In the first four hours, the sample with the commercial hardener had set slightly faster than the 2.5 ratio sample, but after five hours, they were equal. However, the 3.0 ratio hardener containing sample stayed soft much longer. After 24 hours, all three samples were hard.

A small amount of the 2.5 ratio condensed aluminum phosphate was sifted through a No. 325 mesh sieve and another cement sample batch was prepared as before.

This time, the cement set slightly faster than a control cement batch containing the commercial hardener.

EXAMPLE 2

The remainder of the 2.5 ratio premix prepared in Example 1 was placed in a porcelain crucible, put in the furnace and heated according to the following schedule:
- 16 Hours @ 200° C.
- 3 Hours @ 250° C.
- 3 Hours @ 300° C.
- 2 Hours @ 390° C.
- 3 Hours @ 450° C.

After the 200° C. cycle, the weight in the crucible was reduced to 77.6% of charge, after the 390° C. cycle, to 70.0% of charge and after the 450° C. cycle, to 63.2% of charge. The available acidity of the product was 10.7 milliequivalents/gram. After grinding and sifting through a No. 100 mesh sieve, another cement sample batch was prepared exactly as before. The cement had an open work life of 20–25 minutes and a somewhat faster set time than the control using the commercial hardener.

EXAMPLE 3

A premix of $NH_4H_2PO_4$ with $Al(OH)_3$ at a ratio of $P_2O_5$ to $Al_2O_3$ of 2.5 was prepared by ball milling the ingredients together for three hours and sifting them through a No. 100 mesh sieve. Fifty gram amounts of the premix were placed into each of seven porcelain crucibles. The crucibles were put into the furnace and heated according to the following schedule:

Batch A
200° C.-16 Hr, 250° C.-4 Hr, 300° C.-4 Hr, 390° C.-4 Hr, 550° C.-4 Hr.

Batch B
200° C.-16 Hr, 250° C.-3 Hr, 300° C.-3 Hr, 390° C.-1.5 Hr, 550° C.-3 Hr.

Batch C
200° C.-16 Hr, 250° C.-3 Hr, 300° C.-3 Hr, 390° C.-1.5 Hr, 500° C.-3 Hr.

Batch D
200° C.-16 Hr, 250° C.-3 Hr, 300° C.-3 Hr, 390° C.-1.5 Hr, 475° C.-3 Hr.

Batch E
200° C.-16 Hr, 250° C.-3 Hr, 300° C.-3 Hr, 390° C.-1.5 Hr, 450° C.-3 Hr.

Batch F
200° C.-16 Hr, 250° C.-3 Hr, 300° C.-3 Hr, 390° C.-1.5 Hr, 425° C.-3 Hr.

Batch G
200° C.-16 Hr, 250° C.-3 Hr, 300° C.-3 Hr, 390° C.-1.5 Hr, 400° C.-3 Hr.

The furnace was equipped with a microprocessor to increase the temperature for each step automatically. After each step, the heat was increased to the next level linearly within 0.8 hours for Batch A, and within 0.4 hours for the remaining batches. After heating, the batches were ball milled for one hour, except for Batch F, which was ball milled for two hours, and sifted through a No. 100 mesh sieve. A small part of each batch was also screened through a series of finer mesh sieves. Surprisingly, most of the ball milled material was finer than No. 325 mesh, i.e.: $44\mu$ meters.

|  | Yield | Available Acidity | Percentage Finer Than #325 Mesh |
|---|---|---|---|
| Batch A | 62.0% of Charge | 10.7 Milliequivalents/gm. | 91% |
| Batch B | 62.4% of Charge | 10.9 Milliequivalents/gm. | 88% |
| Batch C | 63.0% of Charge | 10.6 Milliequivalents/gm. | 91% |
| Batch D | 63.0% of Charge | 11.2 Milliequivalents/gm. | 89% |
| Batch E | 63.8% of Charge | 10.5 Milliequivalents/gm. | 85% |
| Batch F | 67.4% of Charge | 10.0 Milliequivalents/gm. | 96% |
| Batch G | 68.8% of Charge | 9.3 Milliequivalents/gm. | 81% |
| Commercial Hardener | — | 10.5 Milliequivalents/gm. | 70% |

Twenty grams of each batch were mixed with a quartz sand filler mixture at a weight ratio of 3.8 to 96.2. Cement sample batches were prepared using a commercial potassium water glass solution of 42° Baume density and a weight ratio of silica to potassium oxide of 1.8. For each 280 grams of sand-hardener mixture, 100 grams of water glass solution were used. One inch right test cylinders (one inch in diameter and one inch in height) were cast from each cement sample for determination of the compressive strength. Also, the work life and set time were determined according to ASTM-C414. The results are listed in Table I:

TABLE I

|  | WORK LIFE | SET TIME | COMPRESSIVE STRENGTH AFTER 4 DAYS | COMPRESSIVE STRENGTH AFTER 7 DAYS | COMPRESSIVE STRENGTH AFTER 14 DAYS |
|---|---|---|---|---|---|
| Batch A | 49 Minutes | 6 Hrs., 25 Mins. | 1330 PSI | 2350 PSI | 4570 PSI |
| Batch B | 49 Minutes | 6 Hrs., 27 Mins. | 1130 PSI | 2760 PSI | 4910 PSI |
| Batch C | 38 Minutes | 5 Hrs., 16 Mins. | 1800 PSI | 3200 PSI | 4390 PSI |
| Batch D | 41 Minutes | 5 Hrs., 08 Mins. | 1770 PSI | 2480 PSI | 3540 PSI |
| Batch E | 43 Minutes | 4 Hrs., 52 Mins. | 2140 PSI | 3420 PSI | 5650 PSI |
| Batch F | 8 Minutes | 2 Hrs., 21 Mins. | 2040 PSI | 3280 PSI | 5480 PSI |
| Batch G | 4 Minutes | 0 Hrs., 35 Mins. | 1500 PSI | 2430 PSI | 4690 PSI |
| Commercial Hardener | 38 Minutes | 5 Hrs., 10 Mins. | 900 PSI | 3100 PSI | 5150 PSI |

In order to illustrate the need to avoid too high an internal temperature and too fast a heat-up cycle, a premix was prepared by thoroughly mixing 39.5 grams of finely powdered monoammonium phosphate and 10.5 grams of aluminum hydroxide powder with 66.3% $Al_2O_3$ assay and placing the mixture in a porcelain crucible. Also, 40.6 grams of finely powdered diammonium phosphate were mixed with 9.4 grams of the same assay aluminum hydroxide and placed into a porcelain crucible. The mole ratio of $P_2O_5$ to $Al_2O_3$ was 2.5 in both cases. The crucibles were placed in a furnace and heated according to the following schedule:

45 Minutes @ 215° C.
1 Hour @ 250° C.
30 Minutes @ 300° C.
Shutdown overnight; restarted next morning.
1 Hour @ 300° C.
2.5 Hours @ 400° C.
3 Hours @ 700° C.

Above 250° C., the contents of the crucibles started to melt or liquify and to foam, especially the batch with diammonium phosphate. After cooling, the reaction products were solid foams. The solids were scraped out of the crucibles and ground down into a fine powder in a mortar. The yields were: 30.5 grams=61% of charge for the monoammonium phosphate batch and 26.8 grams=53.6% of charge for the diammonium phosphate batch. The availability acidity was 7.4 milliequivalents/gram for the monoammonium phosphate batch and 6.5 milliequivalents/gram for the diammonium phosphate batch.

As a control, 280 grams of a quartz sand mixture, containing 3.8% by weight of a commercial condensed aluminum phosphate hardener having an available acidity of 10.5 milliequivalents/gram, were mixed by hand stirring with 100 grams of a potassium water glass solution having a concentration of 40-42% and a mole ratio of $SiO_2$ to $K_2O$ of 2.8.

Similarly, 380 gram cement batches were mixed using the two hardener compounds prepared above. Because the commercial hardener had a higher available acidity of 10.5 milliequivalents/gram, the amounts of the compounds used were adjusted accordingly to 5.4% and 6.1% percent respectively.

As a further control, a 380 gram cement batch was mixed the same way, but without a hardener.

All four cement batches were left in covered plastic beakers. After two days, the batch made with the commercial hardener was completely hardened, while the two batches with the prepared compounds needed three days. The cement batch with no hardener was still soft after one week.

In order to investigate whether phosphorus pentoxide ($P_2O_5$) could be used directly in the solid state reaction the same way as the ammonium phosphates, the following was tried: 27.9 grams of $P_2O_5$ powder was mixed with 12.1 grams of $Al(OH)_3$ (66.3% $Al_2O_3$) giving a mole ratio of $P_2O_5$ to $Al_2O_3$ of 2.5.

After placing a mixture in a crucible and putting the crucible into the furnace, the batch was heated according to the following schedule:

16 Hours @ 200° C.
3.5 Hours @ 250° C.
3 Hours @ 300° C.
1.5 Hours @ 390° C.
3 Hours @ 500° C.

After the first hour of the 200° C. cycle, the contents of the crucible foamed considerably and partly went over the edge. After the batch had cooled at the end of the 500° C. cycle, it consisted of a fused foamy mass. The product was ground and sifted through a No. 100 mesh sieve. Available acidity was 7.7 milliequivalents/gram. A cement sample batch, using 5.6% of the product to adjust for the lower available acidity, was mixed the same as the previous examples. The material did not perform at all. Even after 20 hours, the cement was still soft.

The process of the invention has a number of advantages: First, it does not require the energy consuming step of water evaporation; second, the hardener is prepared in relatively soft cakes that can be powdered by simply ball milling which results in less coarse material in the powder; third, because there is no wet or semi-solid material formed during the reaction, the reaction mixture is not corrosive and inexpensive reation vessels and equipment can be used, such as Armco iron and porcelain crucibles. Further, in spite of the fact that multiple temperature heating steps are used in the reaction, the reaction mixture does not have to be ground at an intermediate stage and the entire reaction can take place in the same vessel without removing it from the furnace.

We claim:

1. A method of making a condensed aluminum phosphate comprising dry mixing aluminum hydroxide with an ammonium phosphate and heating the mixture at an initial temperature which is sufficient to decompose the ammonium phosphate but below about 250° C. for longer than about two hours and then raising the temperature in stages so as to form by a solid state reaction a condensed aluminum phosphate which is useful as a hardener for water glass cements the X-ray diffraction pattern of said condensed aluminum phosphate showing a high peak at $2\theta=61.1°$, but not showing a peak at $2\theta=11.2°$.

2. The process of claim 1 wherein the temperature stages include heating at about 190°-210° C. for from longer than about 2 hours, heating at about 250° C. for 1.5 to 4 hours, and heating at from about 400° to 550° C. for 1.5 to 4 hours.

3. The process of claim 2 in which the temperature stages include heating for 1.5 to 4 hours at a temperature of about 300° C. and for 1.5 to 4 hours at a temperature of about 390° C.

4. The process of claim 3 wherein the ammonium phosphate is monoammonium phosphate.

5. The process of claim 2 wherein the heating time at about 190°-210° C. is up to about 16 hours.

6. The method of claim 1 wherein the mixture in the initial stage heated at a temperature of from about 190°-200° C.

7. The method of claim 6 wherein the mixture is heated to a final temperature of at least about 400° C.

8. The method of claim 1 wherein the proportions of aluminum hydroxide and ammonium phosphate provide ratios of $Al_2O_3$ to $P_2O_5$ in the range of about 2:1 to 3:1.

9. The process of claim 8 wherein the ratio of $Al_2O_3$ to $P_2O_5$ is about 2.5 to 1.

10. The method of claim 1 wherein the initial temperature is about 215° C. or below.

11. The method of claim 1 wherein the ammonium phosphate is selected from the group consisting of mono, di and triammonium phosphate and mixtures thereof.

12. The method of claim 1 including the step of grinding the condensed aluminum phosphate.

* * * * *

UNITED STATES PATENT AND TRADEMARK OFFICE
CERTIFICATE OF CORRECTION

PATENT NO. : 4,395,387
DATED : July 26, 1983
INVENTOR(S) : Kurt Goltz and William T. West It is certified that error appears in the above—identified patent and that said Letters Patent is hereby corrected as shown below:

Column 8, line 33 as reads "$2\theta = 61.1°$" should read
-- $2\theta = 16.1°$ --.

Signed and Sealed this

Nineteenth Day of June 1984

[SEAL]

Attest:

Attesting Officer

GERALD J. MOSSINGHOFF

Commissioner of Patents and Trademarks